United States Patent
Marquess et al.

(10) Patent No.: US 9,021,047 B2
(45) Date of Patent: Apr. 28, 2015

(54) METHOD AND SYSTEM FOR DELIVERING EMBEDDED OBJECTS IN A WEBPAGE TO A USER AGENT USING A NETWORK DEVICE

(75) Inventors: Paul Marquess, Belfast (GB); Matt Halligan, Enniskillen (GB)

(73) Assignee: Unwired Planet, LLC, Reno, NV (US)

( * ) Notice: Subject to any disclaimer, the term of this patent is extended or adjusted under 35 U.S.C. 154(b) by 56 days.

(21) Appl. No.: 13/194,629

(22) Filed: Jul. 29, 2011

(65) Prior Publication Data
US 2012/0030305 A1  Feb. 2, 2012

Related U.S. Application Data

(60) Provisional application No. 61/369,674, filed on Jul. 31, 2010.

(51) Int. Cl.
H04L 29/06 (2006.01)
G06F 17/30 (2006.01)
H04L 29/08 (2006.01)

(52) U.S. Cl.
CPC .... *G06F 17/30902* (2013.01); *G06F 17/30861* (2013.01); *H04L 67/2819* (2013.01); *H04L 67/327* (2013.01)

(58) Field of Classification Search
CPC ............... G06F 17/30905; G06F 17/30902
USPC ........................................................ 709/213
See application file for complete search history.

(56) References Cited

U.S. PATENT DOCUMENTS

| | | | |
|---|---|---|---|
| 6,289,382 B1 | 9/2001 | Bowman-Amuah | |
| 6,529,948 B1 | 3/2003 | Bowman-Amuah | |
| 6,553,393 B1 | 4/2003 | Eilbott et al. | |
| 6,947,440 B2 | 9/2005 | Chatterjee et al. | |
| 6,990,534 B2 | 1/2006 | Mikhailov et al. | |
| 7,003,284 B2 | 2/2006 | Schwartz et al. | |
| 7,024,473 B2 | 4/2006 | Parent | |
| 7,333,801 B2 | 2/2008 | Chandhok | |
| 7,873,705 B2 | 1/2011 | Kalish | |
| 8,069,406 B2 | 11/2011 | Weiss et al. | |
| 8,103,742 B1 * | 1/2012 | Green | 709/218 |
| 8,156,429 B2 | 4/2012 | Lotenberg | |
| 8,291,007 B2 | 10/2012 | Orr et al. | |
| 8,788,612 B1 | 7/2014 | Levesque | |
| 2001/0003823 A1 * | 6/2001 | Mighdoll et al. | 709/200 |

(Continued)

OTHER PUBLICATIONS

Enhua Tan, Songqing Chen, Xiaodong Zhang, "SCAP: Smart Caching in Wireless Access Points to Improve P2P Streaming", 2007, p. 1-8.

(Continued)

*Primary Examiner* — Jason K Gee (57) ABSTRACT

A method and system for delivering embedded objects in a webpage to a user agent using a network device is described. In one embodiment, a method for delivering embedded objects in a webpage to a user agent using a network device is described. The method for delivering embedded objects in a webpage to a user agent using a network device involves intercepting a webpage at a network device, where the webpage is transmitted from a web server and is destined to a user agent, scanning the webpage at the network device to discover links that are embedded in the webpage, obtaining an object that is identified by one of the links at the network device, and transmitting the object from the network device to the user agent as soon as the object is obtained at the network device. Other embodiments are also described.

25 Claims, 8 Drawing Sheets

(56) References Cited

U.S. PATENT DOCUMENTS

| | | | |
|---|---|---|---|
| 2002/0046264 | A1 | 4/2002 | Dillon et al. |
| 2002/0099785 | A1 | 7/2002 | Teeple |
| 2003/0018714 | A1 | 1/2003 | Mikhailov et al. |
| 2003/0078964 | A1 | 4/2003 | Parrella et al. |
| 2003/0079041 | A1 | 4/2003 | Parrella et al. |
| 2003/0084177 | A1 | 5/2003 | Mulligan |
| 2003/0092376 | A1 | 5/2003 | Syed |
| 2003/0145038 | A1 | 7/2003 | Bin Tariq et al. |
| 2005/0096016 | A1 | 5/2005 | Tervo et al. |
| 2005/0144278 | A1 | 6/2005 | Atamaniouk |
| 2006/0007902 | A1* | 1/2006 | Heller ............................ 370/338 |
| 2006/0069617 | A1 | 3/2006 | Milener et al. |
| 2006/0085420 | A1* | 4/2006 | Hwang ............................ 707/10 |
| 2006/0253546 | A1 | 11/2006 | Chang et al. |
| 2007/0260748 | A1 | 11/2007 | Talkington |
| 2008/0133830 | A1 | 6/2008 | Nitta et al. |
| 2008/0229023 | A1* | 9/2008 | Plamondon ................... 711/126 |
| 2009/0094377 | A1 | 4/2009 | Zahavi et al. |
| 2009/0157834 | A1 | 6/2009 | Krishnaswamy |
| 2009/0196218 | A1 | 8/2009 | Pulini et al. |
| 2009/0210631 | A1 | 8/2009 | Bosworth et al. |
| 2010/0034089 | A1 | 2/2010 | Kovvali et al. |
| 2010/0034218 | A1 | 2/2010 | Kovvali et al. |
| 2010/0057883 | A1* | 3/2010 | Cao et al. ...................... 709/218 |
| 2010/0158026 | A1 | 6/2010 | Valmikam et al. |

OTHER PUBLICATIONS

Fahd R. Dogar, Amar Phanishayee, Himabindu Pucha, Olatunji Ruwase, David G. Andersen, "Ditto—A System for Opportunistic Caching in Multi-hop Wireless Networks", 2008, p. 1-26.

Urs Niesen, Davavrat Shah, Gregory Wornell, "Caching in Wireless Networks", Aug. 13, 2009, p. 1-24.

Songqing Chen, Bo Shen, Susie Wee, Xiaodong Zhang, "Segment-Based Streaming Media Proxy: Modeling and Optimization", IEEE Transactions on Multimedia, vol. 8, No. 2, Apr. 2006, p. 243-256.

Definition of "Birthday paradox"; Wikipedia, Feb. 5, 2007; <http://en.wikipedia.org/wiki/Birthday_paradox>; pp. 1-9.

Network Working Group; "The Point-to-Point Prototcol (PPP)"; Feb. 5, 2007; <http://www.faqs.org/rfcs/rfc1661.html>; pp. 1-39.

Flash Networks product information for NettGain Allegro; Feb. 5, 2007; <http://www.flashnetworks.com/files/pdf/NettGain_Allegro_Brochure.pdf>; 3 pgs.

Flash Networks product information for NettGain 1200; Feb. 5, 2007; <http://www.flashnetworks.com/files/pdf/1200brochure.pdf>; 6 pgs.

Flash Networks product information for NettGain Maestro; Feb. 5, 2007; <http://www.flashnetworks.com/files/pdf/NettGain_Maestro_Brochure.pdf>; 4 pgs.

\* cited by examiner

METHOD AND SYSTEM FOR DELIVERING EMBEDDED OBJECTS IN A WEBPAGE TO A USER AGENT USING A NETWORK DEVICE

CROSS-REFERENCE TO RELATED APPLICATION

This application is entitled to the benefit of provisional U.S. Patent Application Ser. No. 61/369,674, filed Jul. 31, 2010, which is incorporated by reference herein.

BACKGROUND

A webpage is regularly embedded with links that identify external objects such as images, scripts, audios, and videos. However, delivering embedded objects in a webpage to a browser over a limited bandwidth link, such as a wireless link, takes a substantial amount of time and resources. As a result, the overall latency between when the browser requests a webpage and when the browser fully renders web content presented in the webpage is usually significant and can degrade the user experience. The latency can be especially noticeable when accessing web content from mobile devices. Therefore, there is a need for a method and system for delivering embedded objects in a webpage to a browser that can reduce the overall latency.

SUMMARY

Embodiments of a method are described. In one embodiment, a method for delivering embedded objects in a webpage to a user agent using a network device is described. The method for delivering embedded objects in a webpage to a user agent using a network device involves intercepting a webpage at a network device, where the webpage is transmitted from a web server and is destined to a user agent, scanning the webpage at the network device to discover links that are embedded in the webpage, obtaining an object that is identified by one of the links at the network device, and transmitting the object from the network device to the user agent as soon as the object is obtained at the network device. In another embodiment, a method for delivering embedded objects in a webpage to a user agent using a network device through a wireless network is described. The method for delivering embedded objects in a webpage to a user agent using a network device through a wireless network includes intercepting a webpage at a network device, where the webpage is transmitted from a web server through a wired network and is destined to a user agent, scanning the webpage at the network device to discover links that are embedded in the webpage, obtaining an object that is identified by one of the links at the network device, and transmitting the object from the network device to the user agent through a wireless network as soon as the object is obtained at the network device. Other embodiments of a method are also described.

Embodiments of a network device are also described. In one embodiment, a network device includes a webpage interceptor module configured to intercept a webpage, where the webpage is transmitted from a web server and is destined to a user agent, a webpage scanner module configured to scan the webpage to discover links that are embedded in the webpage, an object obtainer module configured to obtain an object that is identified by one of the links, and a transmitter module configured to transmit the object to the user agent as soon as the object is obtained by the object obtainer module. Other embodiments of a network device are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
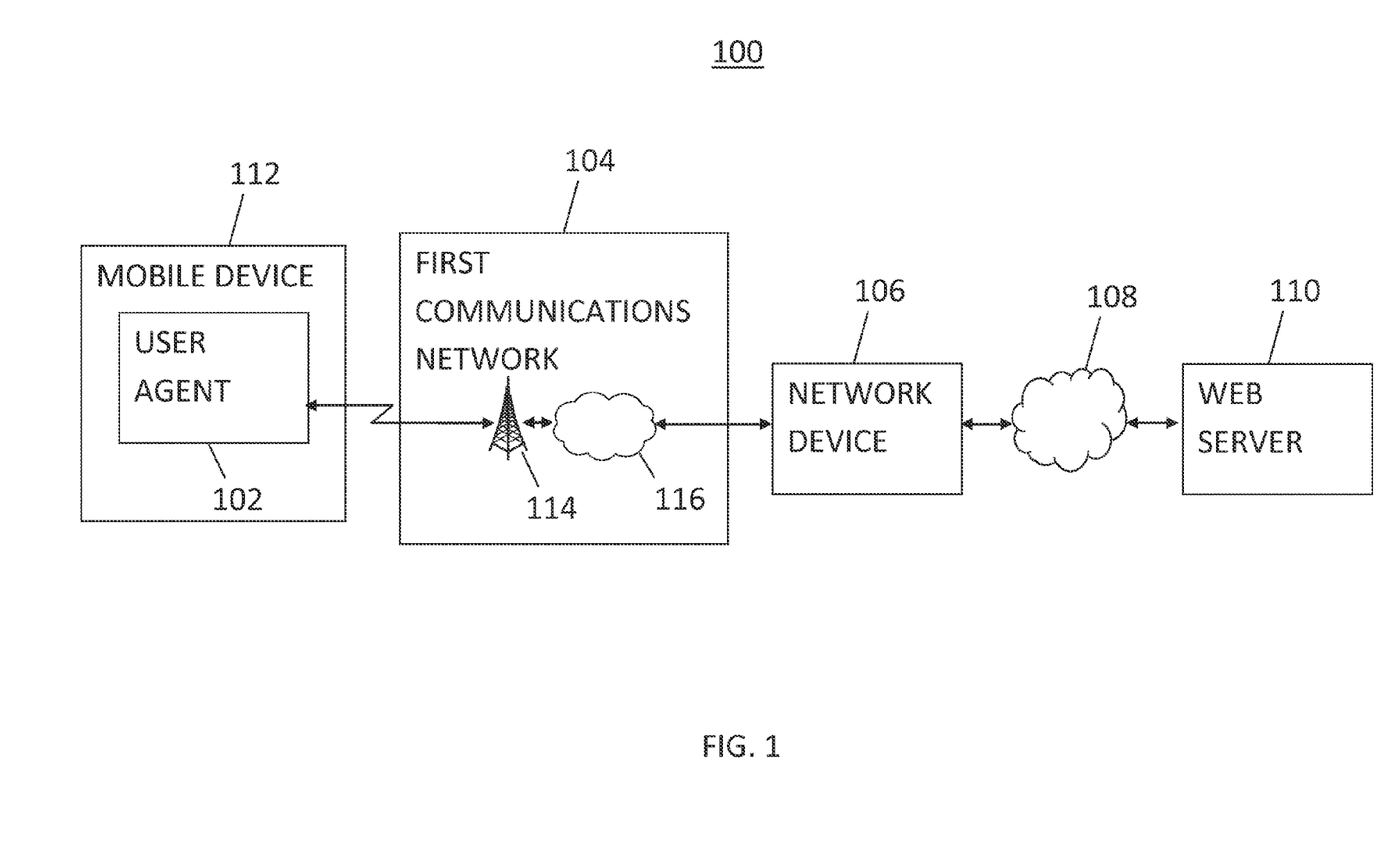
FIG. 1 depicts a schematic block diagram of one embodiment of a web content delivery system.

FIG. 1 depicts a schematic block diagram of one embodiment of a web content delivery system 100. The web content delivery system can deliver web content such as webpage, image, script, audio, animation, or video, or any combination thereof. The web content delivery system depicted in FIG. 1 includes a user agent 102, a first communications network 104, a network device 106, a second communications network 108, and a content server such as a web server 110. Although the web content delivery system is depicted and described with certain components and functionality, other embodiments of the web content delivery system may include fewer or more components to implement less or more functionality.

The user agent 102 of the web content delivery system 100 is configured to request a webpage from the web server 110 on behalf of a user and to render a received webpage for displaying to the user. The user may be a single person, multiple persons, other entity or entities. The user agent may be a content browser or an application program of a communications device of the user. In an embodiment, the user agent is a web browser such as Mozilla Firefox, Microsoft Internet Explorer (IE), Google Chrome, or Apple Safari.

In the embodiment depicted in FIG. 1, the user is at least one mobile user that is equipped with at least one mobile device 112 that wirelessly communicates with the network device 106 and/or the web server 110 using electromagnetic signals such as radio frequency (RF) signals and the user agent is integrated in the mobile device. For example, the mobile user is a person that has an active account with a mobile service provider such as AT&T, Verizon, Sprint, or T-Mobile.

The mobile device 112 may have a wide range of mobility and portability. In an embodiment, the mobile device is a handheld mobile device such as a cellular phone, a Smartphone, a Personal Digital Assistant (PDA), an Enterprise digital assistant (EDA), or a handheld gaming device. In another embodiment, the mobile device is a portable computing device such as a laptop computer, a netbook computer, or a tablet computer. The mobile device may support at least one of various RF communications protocols, including without limitation, Institute of Electrical and Electronics Engineers (IEEE) 802.11 wireless local area network (WLAN), HiperLAN (High Performance Radio LAN), Global System for Mobile communications (GSM), Universal Mobile Telecommunications System (UMTS), Code Division Multiple Access (CDMA), Worldwide Interoperability for Microwave Access (WiMax) and other communications protocols as defined by the 3rd Generation Partnership Project (3GPP), the 3rd Generation Partnership Project 2 (3GPP2), and 4G Long Term Evolution (LTE) standards bodies. Although some wireless communications protocols are identified herein, it should be understood that present disclosure is not limited to the cited wireless communications protocols.

The first communications network 104 of the web content delivery system 100 is the communications channel between the user agent 102 and the network device 106. In an embodiment, the first communications network is the sole communications channel between the user agent and the network device. The first communications network may be a wireless network or a wired network. In an embodiment, the first communications network is a wireless network, which may support at least one of various different RF communications protocols, including without limitation, IEEE 802.11 WLAN, HiperLAN, GSM, UMTS, CDMA, WiMax and other communications protocols as defined by 3GPP, 3GPP2, and 4G LTE standards bodies.

In the embodiment depicted in FIG. 1, the first communications network 104 includes a mobile carrier network 114 and an optional intermediate network 116. The mobile carrier network may be a cellular network from a mobile carrier such as AT&T, Verizon, Sprint, or T-Mobile. The optional intermediate network may be a wired network or a wireless network.

The network device 106 of the web content delivery system 100 is configured to relay the request for the webpage from the user agent 102 to the web server 110, to process the requested webpage that is transmitted from the web server, to obtain objects that are identified by links embedded in the webpage, and to deliver the webpage and the embedded objects in the webpage to the user agent. In an embodiment, the network device is a proxy server such as a Hypertext Transfer Protocol (HTTP) proxy server. In another embodiment, the network device is a network element that transparently monitors communications traffic such as HTTP communications traffic between the user agent and the web server.

In an embodiment, the network device 106 is an Internet gateway that provides a gateway for communications between the mobile carrier network 114 and Internet-connected hosts and/or servers. The Internet gateway may include a Serving General Packet Radio Service (GPRS) Support Node (SGSN) and a Gateway GPRS Support Node (GGSN). The Internet gateway enables mobile devices to access multimedia content, such as Hyper Text Markup Language (HTML), compact HTML (cHTML), and extensible HTML (xHTML) stored on Internet-connected hosts and/or servers. For example, the Internet gateway is a Wireless Application Protocol (WAP) gateway that converts the WAP protocol used by the mobile carrier network to the HTTP protocol used by the Internet.

Figure 2:
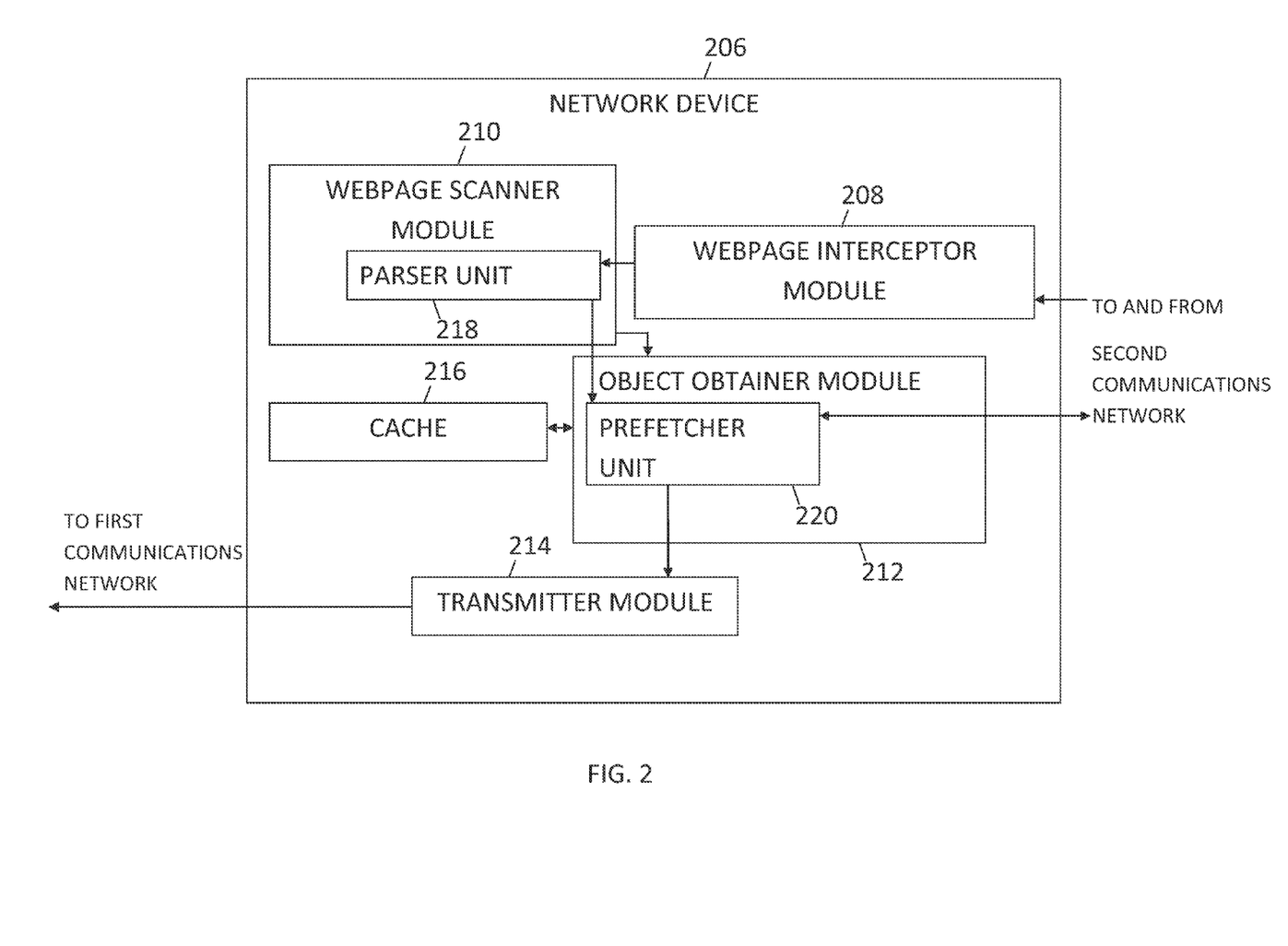
FIG. 2 depicts an embodiment of the network device of the web content delivery system of FIG. 1.

FIG. 2 depicts an embodiment of the network device 106 depicted in FIG. 1. In the embodiment depicted in FIG. 2, the network device 206 includes a webpage interceptor module 208, a webpage scanner module 210, an object obtainer module 212, a transmitter module 214, and an optional cache 216.

The webpage interceptor module 208 of the network device 206 is connected to communicate with the webpage scanner module 210 and with the web server 110 (not shown in FIG. 2) through the second communications network 108. The webpage interceptor module is configured to intercept the webpage that is transmitted from the web server and is destined to the user agent 102 and to output the intercepted webpage to the webpage scanner module.

The webpage scanner module 210 of the network device 206 is connected to communicate with the webpage interceptor module 208 and with the object obtainer module 212. In an embodiment, the webpage scanner module is also connected to communicate with the cache 216. The webpage scanner module is configured to scan the intercepted webpage to discover links that are embedded in the intercepted webpage.

The intercepted webpage can be of any suitable file format. In an embodiment, the intercepted webpage is written in a markup language. Examples of markup languages include, but are not limited to, Hyper Text Markup Language (HTML), compact HTML (cHTML), Extensible Markup Language (XML), and extensible HTML (xHTML). In another embodiment, the intercepted webpage is written in a style sheet language such as Cascading Style Sheets (CSS). In the embodiment depicted in FIG. 2, the intercepted webpage is written in a makeup language such as an HTML page. The webpage scanner module 210 includes a parser unit 218 that is configured to parse the webpage to discover links that are embedded in the webpage.

The object obtainer module 212 of the network device 206 is connected to communicate with the web server 110 (not shown in FIG. 2) through the second communications network 108, with the webpage scanner module 210, and with the optional cache 216. The object obtainer module is configured to obtain at least one object that is identified by at least one of the links discovered by the webpage scanner module. In the embodiment depicted in FIG. 2, the object obtainer module includes a prefetcher unit 220 that is configured to prefetch the object from the web server. In some embodiments, the object obtainer module does not include any prefetcher unit for prefetching embedded objects in a webpage from the web server.

The transmitter module 214 of the network device 206 is connected to communicate with the object obtainer module 212. In an embodiment, the transmitter module is also connected to communicate with the cache 216. The transmitter module is configured to transmit web content to the user agent 102. In an embodiment, the transmitter module is configured to transmit an object to the user agent as soon as the object is obtained by the object obtainer module.

The optional cache 216 of the network device 206 is configured to store web content such as webpage, image, script, audio, animation, or video, or any combination thereof. In an embodiment, the optional cache is a memory chip.

Figure 3:
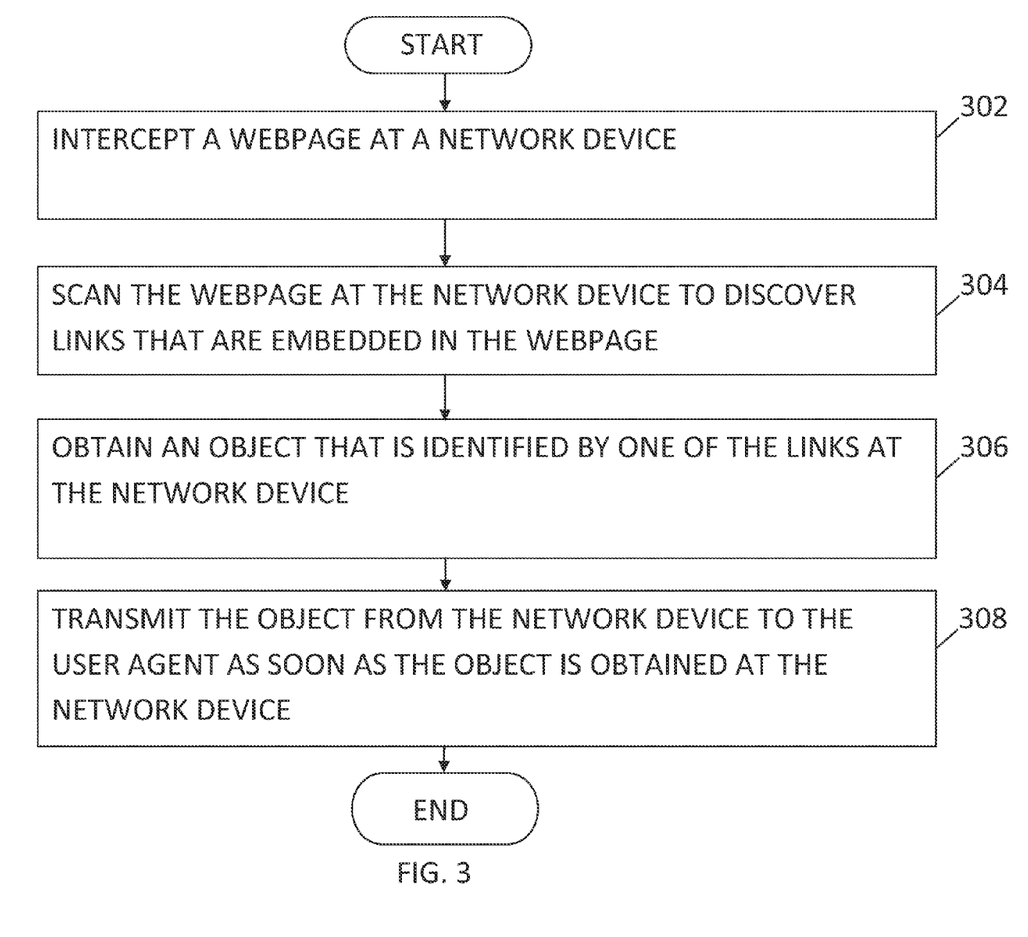
FIG. 3 is a process flow diagram of a first example of an operation of the network device depicted in FIG. 2.

Four examples of operations of the network device 206 depicted in FIG. 2 are described with reference to FIGS. 3-6. FIG. 3 is a process flow diagram of a first example of an operation of the network device depicted in FIG. 2. At block 302, a webpage is intercepted at the network device by the webpage interceptor module 208. The webpage is transmitted from the web server 110 and is destined to the user agent 102. At block 304, the webpage is scanned at the network device by the webpage scanner module 210 to discover links that are embedded in the webpage. At block 306, an object that is identified by at least one of the links is obtained at the network device by the object obtainer module 212. At block 308, the object is transmitted from the network device to the user agent by the transmitter module 214 as soon as the object is obtained at the network device.

In accordance with an embodiment of the invention, instead of obtaining all of the objects that are identified by the links and then transmitting all of the obtained objects from the network device 206 to the user agent 102 at one time, an object is transmitted from the network device to the user agent as soon as the object is obtained at the network device. For example, the network device obtains an object and immediately transmits the obtained object to the user agent without waiting for more web content to be obtained at the network device. This transmit-as-soon-as-possible approach can reduce the overall latency between when a user agent sends a request for the webpage to the web server 110 and when the webpage is rendered by the user agent. For example, if all of the objects that are identified by the links are obtained before transmission, then the user agent will not receive any data until a complete composite message, which includes all of the embedded objects, is created by the network device and transmitted to the user agent. However, if an object is transmitted from the network device to the user agent as soon as the object is obtained at the network device, the user agent receives each embedded object as soon as the embedded object is available at the network device. Therefore, the user agent can begin to render an embedded object while waiting for other embedded objects from the network device.

In an embodiment, at least one object that is identified by the rest of the links that are embedded in the webpage is prefetched from the web server to the network device by the prefetcher unit 220. The object is then transmitted from the network device 206 to the user agent 102 by the transmitter module 214 according to a time sequence in which the at least one object is prefetched. The object may be transmitted the user agent as soon as the object is prefetched at the network device.

Figure 4:
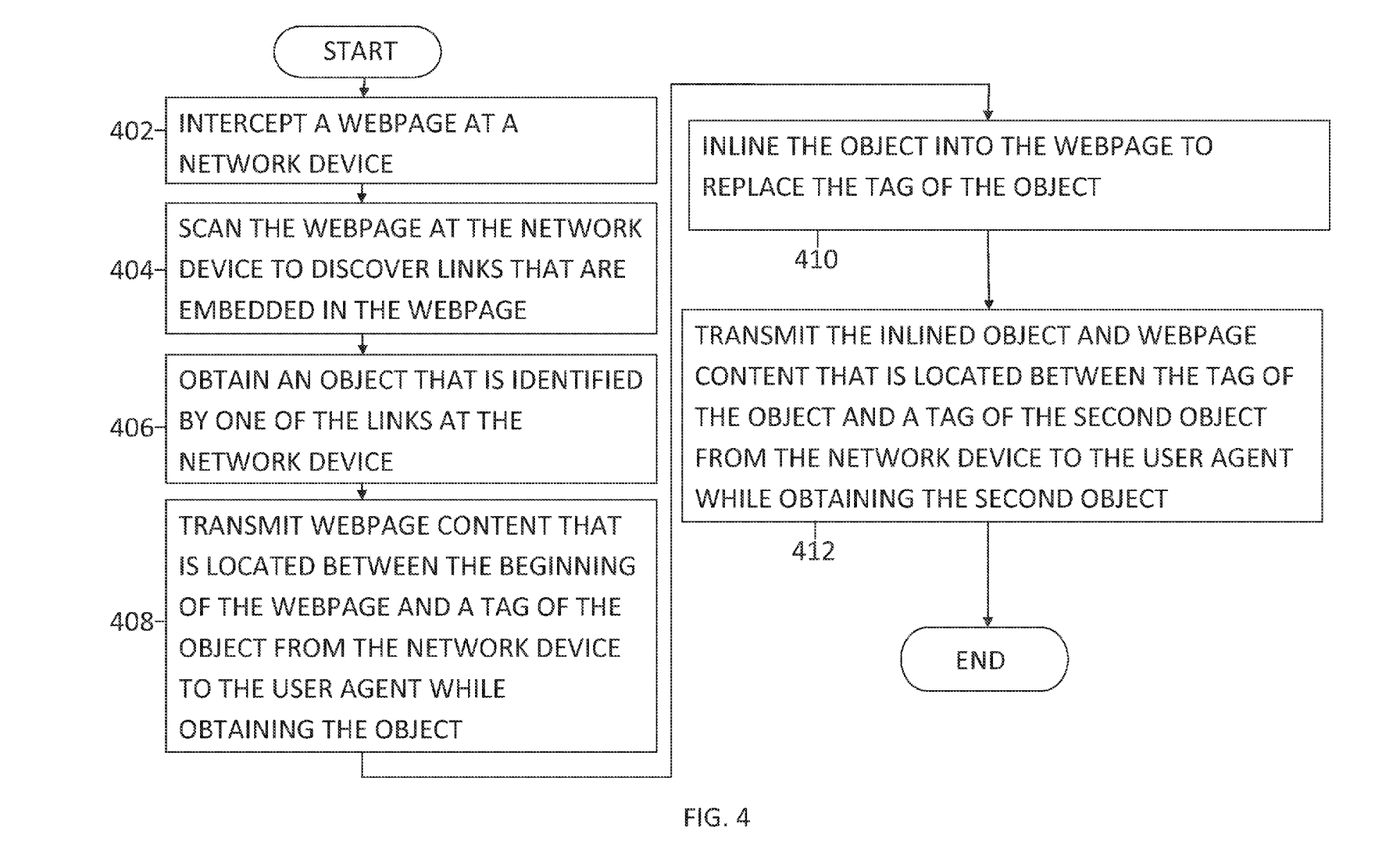
FIG. 4 is a process flow diagram of a second example of an operation of the network device depicted in FIG. 2.

FIG. 4 is a process flow diagram of a second example of an operation of the network device 206 depicted in FIG. 2. At block 402, a webpage is intercepted at the network device by the webpage interceptor module 208. The webpage is transmitted from the web server 110 and is destined to the user agent 102. At block 404, the webpage is scanned at the network device by the webpage scanner module 210 to discover links that are embedded in the webpage. At block 406, an object that is identified by one of the links is obtained at the network device by the object obtainer module 212. At block 408, webpage content that is located between the beginning of the webpage and a tag of the object is transmitted from the network device to the user agent by the transmitter module 214 while the object obtainer module obtains the object. At block 410, the object is inlined, embedded, or inserted into the webpage to replace the tag of the object by the object obtainer module. At block 412, the inlined object and webpage content that is located between the tag of the object and a tag of the second object is transmitted from the network device to the user agent by the transmitter module while the object obtainer module obtains the second object.

Figure 5:
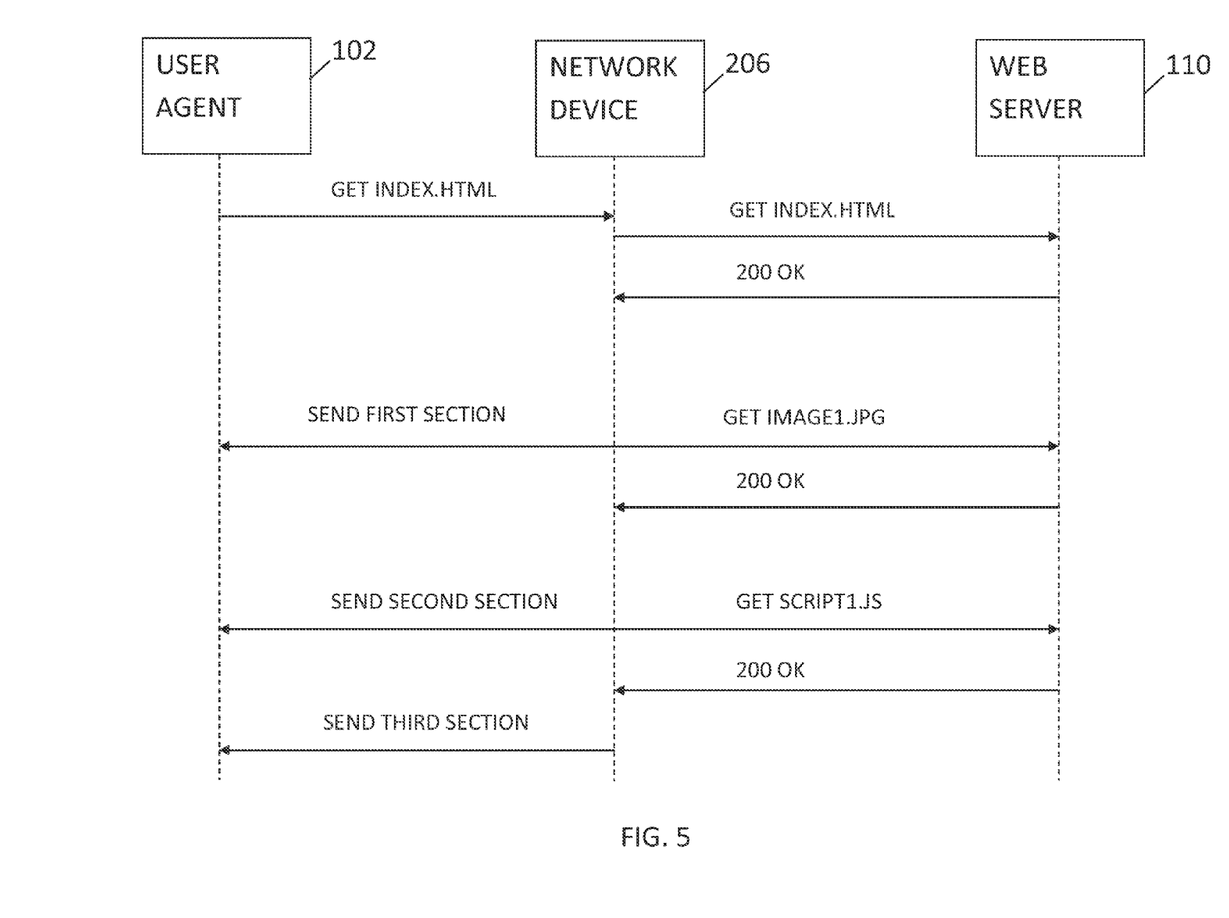
FIG. 5 illustrates an example of a message flow diagram between the user agent depicted in FIG. 1, the network device depicted in FIG. 2, and the web server depicted in FIG. 1.

FIG. 5 illustrates an example of a message flow diagram between the user agent 102 depicted in FIG. 1, the network device 206 depicted in FIG. 2, and the web server 110 depicted in FIG. 1. In the message flow example illustrated in FIG. 5, an "index.html" webpage is embedded with two links. One of the two links is a link to an image object "image1.jpg" and the other link is a link to a script object "script1.js." The user agent sends a "GET index.html" message to the network device to request the "index.html" webpage from the web server. The network device relays the "GET index.html" message to the web server. Then the web server receives the relayed "GET index.html" request from the network device and responds to the network device with the requested "index.html" webpage and a "200 OK" message to indicate that the request was successful. The network device then scans the "index.html" webpage that is received from the web server and discovers the two links to the image object "image1.jpg" and the script object "script1.js." The network device then sends a "GET image1.jpg" message to the web server to prefetch the image object "image1.jpg" and simultaneously sends a first section of the "index.html" webpage to the user agent. The first section of the "index.html" webpage includes webpage content that is located between the beginning of the "index.html" webpage and the tag of the image object "image1.jpg." The web server receives the "GET image1.jpg" request from the network device and responds to the network device with the requested image object "image1.jpg" and a "200 OK" message to indicate that the request was successful. The network device then inlines the image object "image1.jpg" into the webpage to replace the tag of the image object "image1.jpg" to produce a second section of the "index.html" webpage. The second section of the "index.html" webpage includes the inlined image object "image1.jpg" and webpage content that is located between the tag of the image object "image1.jpg" and the tag of the script object "script1.js." The network device then sends a "GET script1.js" message to the web server to prefetch the script object "script1.js" and simultaneously sends the second section of the "index.html" webpage to the user agent. The web server receives the "GET script1.js" request from the network device and responds to the network device with the requested script object "script1.js" and a "200 OK" message to indicate that the request was successful. The network device then inlines the script object "script1.js" into the webpage to replace the tag of the script object "script1.js" to produce a third section of the "index.html" webpage. The third section of the "index.html" webpage includes the inlined script object "script1.js" and webpage content that is located between the tag of the script object "script1.js" and the end of the "index.html" webpage. The network device then sends the third section of the "index.html" webpage to the user agent. With the transmission of the third section of the "index.html" webpage, the transmission of the "index.html" webpage to the user agent is complete.

Figure 6:
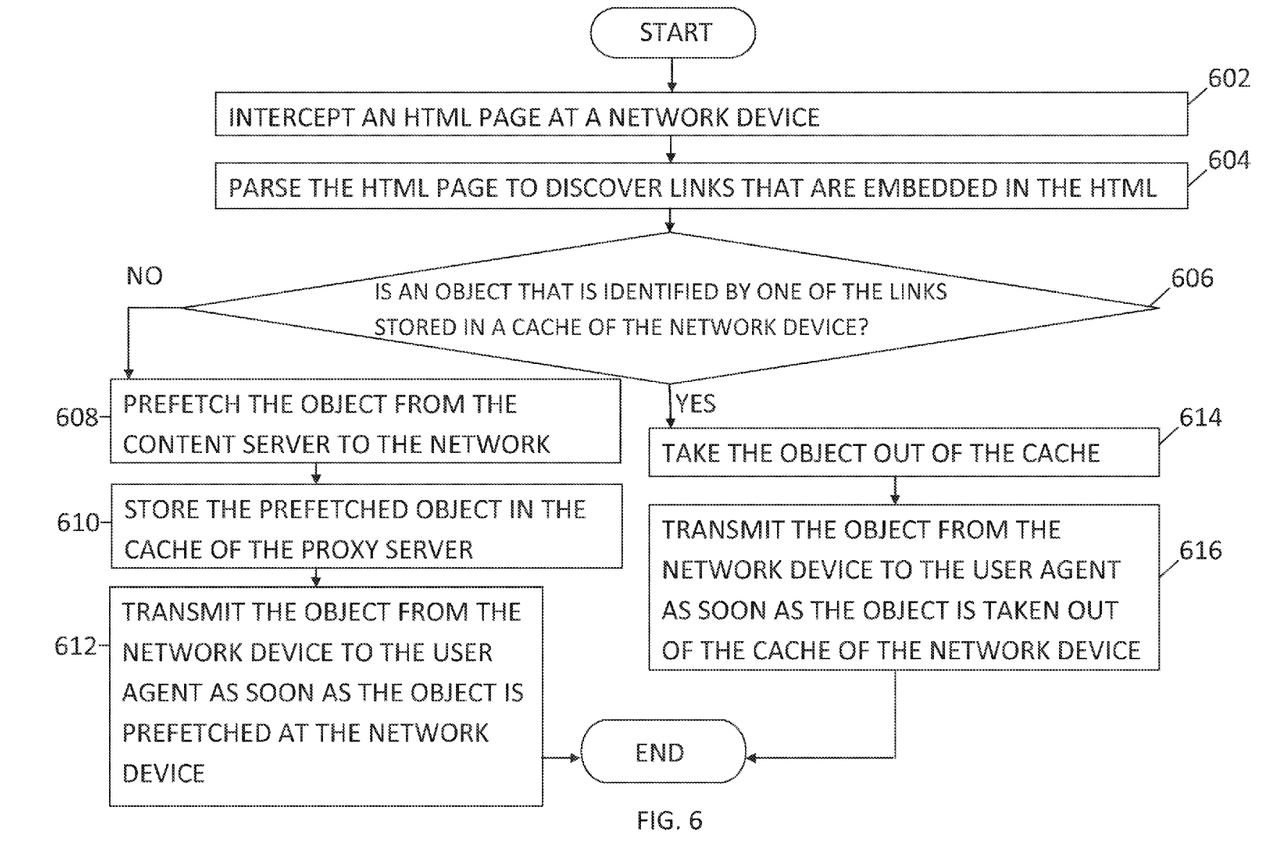
FIG. 6 is a process flow diagram of a third example of an operation of the network device depicted in FIG. 2.

FIG. 6 is a process flow diagram of a third example of an operation of the network device 206 depicted in FIG. 2. At block 602, an HTML page is intercepted at the network device by the webpage interceptor module 208. The HTML page is transmitted from the web server 110 and is destined to the user agent 102. At block 604, the webpage is parsed at the network device by the parser unit 218 to discover links that are embedded in the HTML page. At block 606, whether or not an object that is identified by one of the links is stored in the cache 216 of the network device is determined by the object obtainer module 212. At block 608, block 610, and block 612 respectively, if the object is not stored in the cache of the network device, the object is prefetched from the web server to the network device by the prefetcher unit 220, is stored in the cache of the network device, and is transmitted from the network device to the user agent by the transmitter module 214 as soon as the object is prefetched at the network device. For example, the network device prefetches the object and immediately transmits the prefetched object to the user agent without waiting for more web content to be obtained at the network device. At block 614 and block 616 respectively, if the object is stored in the cache of the network device, the object is taken out of the cache of the network device by the object obtainer module and is transmitted from the network device to the user agent by the transmitter module as soon as the object is taken out of the cache of the network device.

Figure 7:
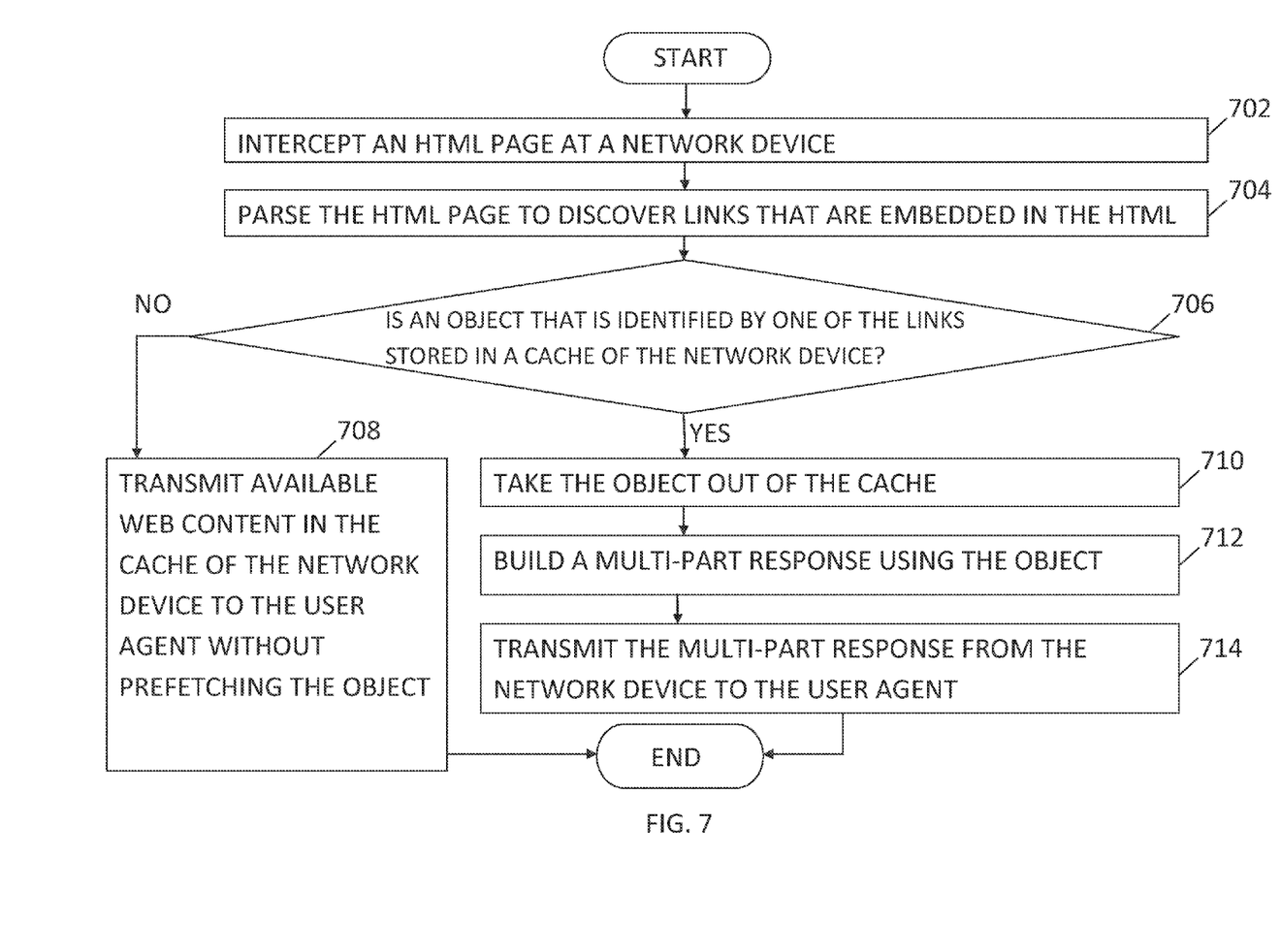
FIG. 7 is a process flow diagram of a fourth example of an operation of the network device depicted in FIG. 2.

FIG. 7 is a process flow diagram of a fourth example of an operation of the network device 206 depicted in FIG. 2. At block 702, a webpage such as an HTML page is intercepted at the network device by the webpage interceptor module 208. The HTML page is transmitted from the web server 110 and is destined to the user agent 102. At block 704, the webpage is parsed at the network device by the parser unit 218 to discover links that are embedded in the HTML page. At block 706, whether or not an object that is identified by one of the links is stored in the cache 216 of the network device is determined by the object obtainer module 212. At block 708, if the object is not stored in the cache of the network device, the object is not prefetched and available web content in the cache of the network device is transmitted from the network device to the user agent. At block 710, block 712, and block 714 respectively, if the object is stored in the cache of the network device, the object is taken out of the cache of the network device by the object obtainer module, a multi-part response is built using the object by the object obtainer module, and the multi-part response is transmitted from the network device to the user agent by the transmitter module 214.

Compared to prefetching objects that are identified by links that are embedded in a webpage from the web server 110, taking only an available object or objects from the cache 216 of the network device 206 can reduce the latency between when a user agent sends a request for the webpage to the web server and when the user agent receives and begins to render content related to the requested webpage. Additionally, compared to building a multi-part response by prefetching an object or objects from the web server, building a multi-part response using only an available object or objects stored in the cache of the network device can reduce the latency between when a user agent sends a request for the webpage to the web server and when the user agent receives and begins to render content related to the requested webpage.

Additionally, one or more steps described in one of the four examples may be included in another one of the four examples. For example, steps depicted in blocks 306 and 308 may be included in the third example of the operation depicted in FIG. 6 between the step depicted by block 604 and the step depicted by block 606 or included in the fourth example of the operation depicted in FIG. 6 between the step depicted by block 704 and the step depicted by block 706.

The operations of the network device 206 are not limited to the examples described in FIGS. 3-7. In an embodiment, where an object, which is embedded in a webpage, is not stored in the cache 216, the network device sends the webpage to the user agent 102. Simultaneously, the network device prefetches the object in a separate thread of execution and stores the prefetched object in the cache. In this case, when the user agent requests an object in order to render the webpage, the object has already been prefetched and stored into the cache. As a result, latency that is experienced by a user of the user agent is reduced.

Referring back to FIG. 1, the second communications network 108 of the web content delivery system 100 is the communications channel between the network device 106 and the web server 110. In an embodiment, the second communications network is the sole communications channel between the network device and the web server. The second communications network can be a wireless network or a wired network. In the embodiment depicted in FIG. 1, the second communications network is a wired network. The second communications network may be an Internet Protocol (IP)-based network that may include a network of interconnected devices such as switches and routers.

In an embodiment, the bandwidth of the first communications network 104 is smaller than the bandwidth of the second communications network 108. In this case, the communications bandwidth between the mobile device 112 and the network device 106 is smaller than the communications bandwidth between the network device and the web server 110. For example, the first communications network is a cellular network from a mobile carrier such as AT&T, Verizon, Sprint, or T-Mobile that has a bandwidth in the range of multiple megabytes per second while the second communications network is a high speed fiber optic network that has a bandwidth in the range of multiple gigabytes per second. The slower network of the first communications network and the second communications network may not be a wireless network. In an example, the slower network of the first communications network and the second communications network is a wired network. In another example, the slower network of the first communications network and the second communications network is a hybrid network that has wired and wireless network components.

The web server 110 of the web content delivery system 100 is configured to process requests for web content from the user agent 102 and/or the network device 106 and to provide requested web content to the user agent and/or the network device. The web server may support at least one of various content delivery protocols. In an embodiment, the web server is an HTTP server. Although the web content delivery system in the embodiment depicted in FIG. 1 includes the web server, other embodiments of the web content delivery system may include a content server of any other type.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In an embodiment, the functionality of the user agent 102 depicted in FIG. 1, the functionality of the network device 106 depicted in FIG. 1, the functionality of the web server 110 depicted in FIG. 1, the functionality of the network device 206 depicted in FIG. 2, the functionality of the webpage interceptor module 208 depicted in FIG. 2, the functionality of the webpage scanner module 210 depicted in FIG. 2, the functionality of the object obtainer module 212 depicted in FIG. 2, and the functionality of the transmitter module 214 depicted in FIG. 2 is performed by computers that execute computer readable instructions.

Figure 8:
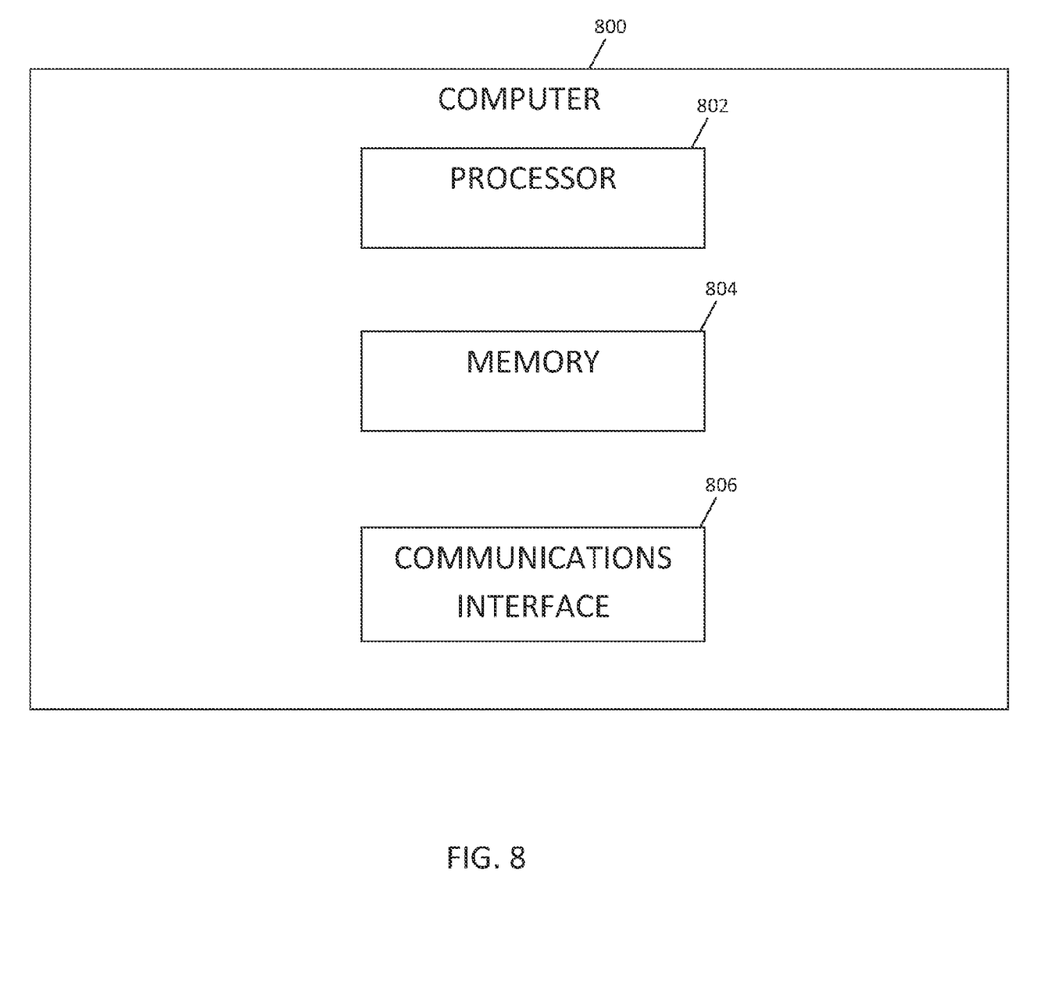
FIG. 8 depicts a computer that includes a processor, memory, and a communications interface.

FIG. 8 depicts a computer 800 that includes a processor 802, memory 804, and a communications interface 806. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via communications protocols, for example, via the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for delivering embedded objects in a webpage to a user agent using a network device, the method comprising:
   intercepting webpage data at a network device, wherein the webpage data comprises a first portion and a second portion, is associated with a webpage, is transmitted from a web server and is addressed to a user agent executing on a client device;
   scanning the intercepted webpage data at the network device to identify one or more links that are embedded in the intercepted webpage data, wherein the one or more links identify one or more objects that are external to the webpage;
   obtaining, by the network device, first object data associated with a first object of said one or more objects;
   transmitting the first portion of the intercepted webpage data from the network device to the user agent while the first object data is being obtained; and
   transmitting the first object data and the second portion of the intercepted webpage data from the network device to the user agent in response to the first object data being obtained by the network device.

2. The method of claim 1, wherein obtaining the first object data comprises prefetching the first object data from the web server to the network device.

3. The method of claim 2, further comprising:
   determining if second object data associated with a second object that is identified by a second one of the one or more links is stored in a cache of the network device;
   if the second object data is stored in the cache of the network device, taking the second object data out of the cache of the network device and transmitting the second object data from the network device to the user agent once the second object data has been taken out of the cache of the network device; and
   if the second object data is not stored in the cache of the network device, prefetching the second object data from the web server to the network device and transmitting the second object data from the network device to the user agent once the object data associated with the second object has been prefetched to the network device.

4. The method of claim 1, further comprising determining that the first object data is stored in a cache of the network device before obtaining the first object data, and wherein obtaining the first object data comprises taking the first object data out of the cache of the network device.

5. The method of claim 4, further comprising:
   determining if second object data associated with a second object that is identified by a second one of the one or more links is stored in the cache of the network device;

if the second object data is stored in the cache of the network device, taking the second object data out of the cache of the network device, building a multi-part response using the first object data and the second object data, and transmitting the multi-part response from the network device to the user agent; and if the second object data is not stored in the cache of the network device, transmitting available webpage data stored in the cache of the network device to the user agent without prefetching the second object data.

6. The method of claim 1, wherein the first portion of the intercepted webpage data comprises content located between the beginning of the webpage and a link associated with the first object, and the second portion of the intercepted webpage data comprises content located between the link associated with the first object and a link identifying a second object of said one or more objects.

7. The method of claim 3, wherein transmitting the first object data from the network device to the user agent in response to the first object data being obtained at the network device comprises:

inserting the first object data into the intercepted webpage data to replace the link associated with the first object; and transmitting the first object data and the second portion of the intercepted webpage data from the network device to the user agent while obtaining the second object data.

8. The method of claim 2 further comprising:
prefetching second object data associated with the second object from the web server to the network device; and
transmitting the second object data from the network device to the user agent as soon as the second object data has been prefetched to the network device.

9. The method of claim 2 further comprising:
prefetching second object data associated with a second object identified by one of the one or more links from the web server to the network device; and
transmitting the second object data from the network device to the user agent according to a time sequence in which the second object data is prefetched.

10. The method of claim 3 further comprising storing the prefetched second object data in the cache of the network device.

11. The method of claim 1, wherein the webpage is written in a markup language, and wherein scanning the intercepted webpage data at the network device to identify the links that are embedded in the intercepted webpage data comprises parsing the intercepted webpage data to identify links that are embedded in the intercepted webpage data.

12. The method of claim 2, wherein transmitting the first object data from the network device to the user agent comprises transmitting the first object data from the network device to the user agent through a first communications network, wherein prefetching the first object data from the web server to the network device comprises prefetching the first object data from the web server to the network device through a second communications network, and wherein a bandwidth of the first communications network is smaller than a bandwidth of the second communications network.

13. The method of claim 12, wherein the user agent is located in a mobile device, and wherein the first communications network is a mobile carrier network.

14. The method of claim 1, wherein the first object is an object selected from a group consisting of an image file, an audio file, and a video file.

15. The method of claim 1, wherein transmitting the first object data and the second portion of the intercepted webpage data comprises forming a multipart message comprising the first object data and the second portion of the intercepted webpage data.

16. The method of claim 1, wherein the first object data and the second portion of the intercepted webpage data are transmitted concurrently to the user agent.

17. A network device for delivering embedded objects in a webpage to a user agent, the network device comprising a processor configured to:

intercept webpage data, wherein the intercepted webpage data comprises a first portion and a second portion, is associated with a webpage, is transmitted from a web server and is addressed to a user agent executing on a client device;

scan the intercepted webpage data to identify one or more links that are embedded in the intercepted webpage data, wherein the one or more links identify one or more objects that are external to the webpage;

obtain first object data associated with a first object of said one or more objects;

transmit the first portion of the intercepted webpage data to the user agent while the first object data is being obtained; and transmit the first object data and the second portion of the intercepted webpage data to the user agent in response to the first object data being obtained by the network device.

18. The network device of claim 17, wherein the processor is configured to prefetch the first object data from the web server.

19. The network device of claim 18 further comprising a cache, wherein the processor is configured:

to determine that the first object data is stored in the cache of the network device before obtaining the first object data and to take the first object data out of the cache;

to determine if second object data associated with a second object identified by a second one of the one or more links is stored in the cache; and if the second object data is stored in the cache, to take the second object data out of the cache and to build a multi-part response using the first object data and the second object data, wherein the processor is further configured, if the second object data is stored in the cache, to transmit the multi-part response to the user agent, and wherein the network device is further configured, if the second object data is not stored in the cache, to transmit available webpage data stored in the cache of the network device to the user agent without prefetching the second object data.

20. The network device of claim 18, wherein the network device is configured:

to communicate with the user agent through a first communications network; and to communicate with the web server through a second communications network, and wherein a bandwidth of the first communications network is smaller than a bandwidth of the second communications network.

21. A method for delivering embedded objects in a webpage to a user agent using a network device through a wireless network, the method comprising:

intercepting webpage data at a network device, wherein the intercepted webpage data comprises a first portion and a second portion, is associated with a webpage, is transmitted from a web server through a wired network and is addressed to a user agent executing on a client device;

scanning the intercepted webpage data at the network device to identify one or more links that are embedded in the intercepted webpage data, wherein the one or more links identify one or more objects that are external to the webpage;

obtaining, by the network device, first object data associated with a first object of said one or more objects;

transmitting the first portion of the intercepted webpage data from the network device to the user agent while the first object data is being obtained; and transmitting the first object data and the second portion of the intercepted webpage data from the network device to the user agent through a wireless network in response to the first object data being obtained by the network device.

22. The method of claim 21, wherein obtaining the first object data comprises prefetching the first object data from the web server to the network device through the wired network, the method further comprising:

determining if second object data associated with a second object that is identified by a second one of the one or more links is stored in a cache of the network device;

if the second object data is stored in the cache of the network device, taking the second object data out of the cache of the network device and transmitting the second object data from the network device to the user agent through the wireless network as soon as the second object data is taken out of the cache of the network device; and if the second object data is not stored in the cache of the network device, prefetching the second object data from the web server to the network device through the wired network and transmitting the second object data from the network device to the user agent through the wireless network as soon as the second object data has been prefetched to the network device.

23. The method of claim 21, further comprising determining that the first object data is stored in a cache of the network device before obtaining the first object data, wherein obtaining the first object data comprises taking the first object data out of the cache of the network device, the method further comprising:

determining whether or not second object data associated with a second object that is identified by a second one of the one or more links is stored in the cache of the network device;

if the second object data is stored in the cache of the network device, taking the second object data out of the cache of the network device, building a multi-part response using the first object data and the second object data, and transmitting the multi-part response from the network device to the user agent through the wireless network; and if the second object data is not stored in the cache of the network device, transmitting available webpage data stored in the cache of the network device to the user agent without prefetching the second object data.

24. A computer program product comprising a non-transitory computer-readable storage medium having computer readable instructions stored thereon, the computer readable instructions being executable by a computerized device to cause the computerized device to perform a method for delivering embedded objects in a webpage to a user agent, the method comprising:

intercepting webpage data at a network device, wherein the intercepted webpage data comprise a first portion and a second portion, is associated with a webpage, is transmitted from a web server and is addressed to a user agent executing on a client device;

scanning the intercepted webpage data at the network device to identify one or more links that are embedded in the intercepted webpage data, wherein the one or more links identify one or more objects that are external to the webpage;

obtaining, by the network device, first object data associated with a first object of said one or more objects;

transmitting the first portion of the intercepted webpage data from the network device to the user agent while the first object data is being obtained; and transmitting the first object data and the second portion of the intercepted webpage data from the network device to the user agent in response to the first object data being obtained by the network device.

25. A computer program product comprising a non-transitory computer-readable storage medium having computer readable instructions stored thereon, the computer readable instructions being executable by a computerized device to cause the computerized device to perform a method for delivering embedded objects in a webpage to a user agent through a wireless network, the method comprising:

intercepting webpage data at a network device, wherein the intercepted webpage data comprises a first portion and a second portion, is associated with a webpage, is transmitted from a web server through a wired network and is addressed to a user agent executing on a client device;

scanning the intercepted webpage data at the network device to identify one or more links that are embedded in the intercepted webpage data, wherein the one or more links identify one or more objects that are external to the webpage;

obtaining, by the network device, first object data associated with a first object of said one or more objects;

transmitting the first portion of the intercepted webpage data from the network device to the user agent while the first object data is being obtained; and transmitting the first object data and the second portion of the intercepted webpage data from the network device to the user agent through a wireless network in response to the first object data being obtained by the network device.

* * * * *